(No Model.) 2 Sheets—Sheet 1.

G. W. BRABB & L. M. SMITH.
ROAD CART.

No. 409,663. Patented Aug. 27, 1889.

WITNESSES
W. H. Chamberlin
L. A. Daelty

INVENTOR
Loring M. Smith
George W. Brabb
By Wells W. Leggett & Co.
Attorneys.

(No Model.) 2 Sheets—Sheet 2.

G. W. BRABB & L. M. SMITH.
ROAD CART.

No. 409,663. Patented Aug. 27, 1889.

WITNESSES
W. H. Chamberlin
L. A. Dvelty

INVENTOR
Loring M. Smith
George W. Brabb
By Wills W. Leggett & Co.
Attorneys.

UNITED STATES PATENT OFFICE.

GEORGE W. BRABB AND LORING M. SMITH, OF ROMEO, MICHIGAN.

ROAD-CART.

SPECIFICATION forming part of Letters Patent No. 409,663, dated August 27, 1889.

Application filed May 27, 1889. Serial No. 312,311. (No model.)

*To all whom it may concern:*

Be it known that we, GEORGE W. BRABB and LORING M. SMITH, citizens of the United States, residing at Romeo, county of Macomb, State of Michigan, have invented a certain new and useful Improvement in Road-Carts; and we declare the following to be a full, clear, and exact description of the invention, such as will enable others skilled in the art to which it pertains to make and use the same, reference being had to the accompanying drawings, which form a part of this specification.

It is the object of our invention to provide a road-cart wherein the body of the vehicle will be supported from points adjacent to the axle, and thus bringing the center of gravity of the load over the axle and also lessening the horse motion. This we accomplish by a combination of devices hereinafter more fully shown and described.

Figure 1:
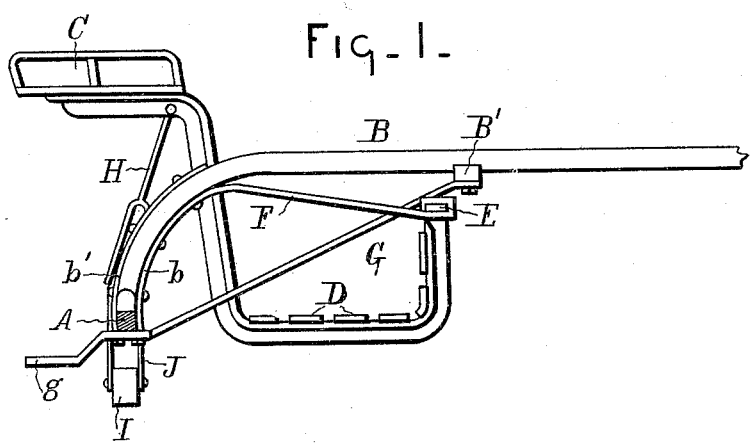
Figure 2:
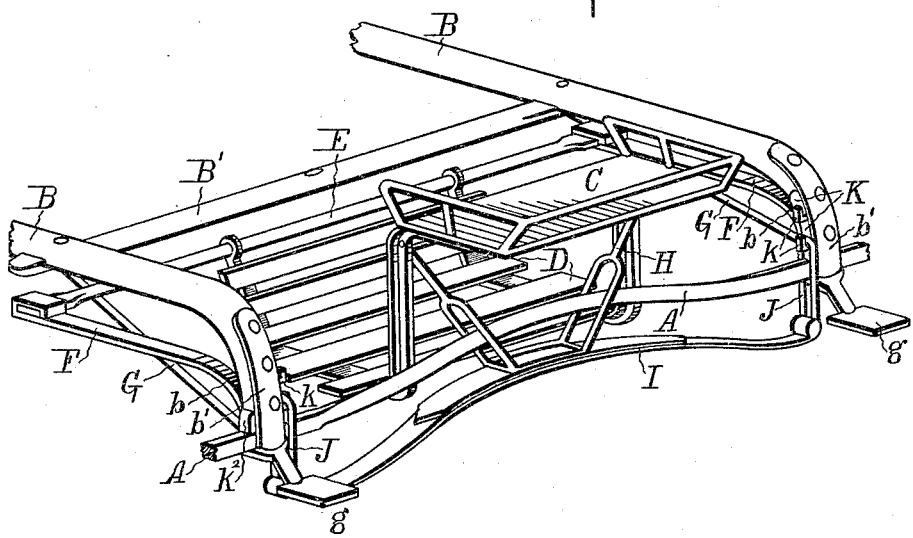
Figure 3:
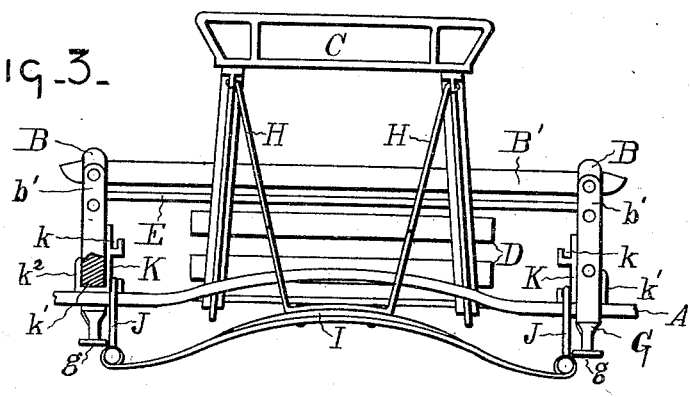

In the drawings, Figure 1 is a side elevation of our improved road-cart with the wheels removed. Fig. 2 is a perspective view, Fig. 3 a rear elevation, and Fig. 4 a side elevation, of a variation, showing the invention as applied to a cart with a phaeton body, with one shaft removed and the axle in section. Fig. 5 is a detail view of a part of Fig. 4.

In the above drawings, A represents the axle, and B the shafts leading therefrom.

B' is the cross-bar between the shafts to which the whiffletree is attached; C, the seat, and D the crate-bars.

E is a cross-bar to which the forward ends of the crate-bar are attached, the ends of this cross-bar terminating adjacent to and underneath the shafts.

F are springs which are attached to the shafts and extend forward underneath and preferably parallel with and adjacent to the shafts. They extend to the cross-bar E, where they are engaged to the ends of the cross-bar.

The ends of the springs F which are attached to the shafts may, if desired, be continued downward so as to constitute the forward post $b$ of the shaft-iron, and, with the shaft-iron $b'$ on the back of the shaft, pass through the brace-rod G, and with the latter form the clip by which the shaft is attached to the axle. The brace may also provide at the axle a step $g$.

H are rods yoked over the axle. They descend from the crate-bars to the leaf-spring I, which is located beneath the axle, and the spring is supported at its ends by the loops J engaging with the plates K. These plates K are attached to the face of the shafts and are provided with hooks $k$, over which the loops J are hung. By providing these plates K with several hooks the seat may be adjusted to a higher or lower level. The plate K also extends beneath the end of the shaft and up along its further side, as shown at $k'\ k^2$.

Figure 4:
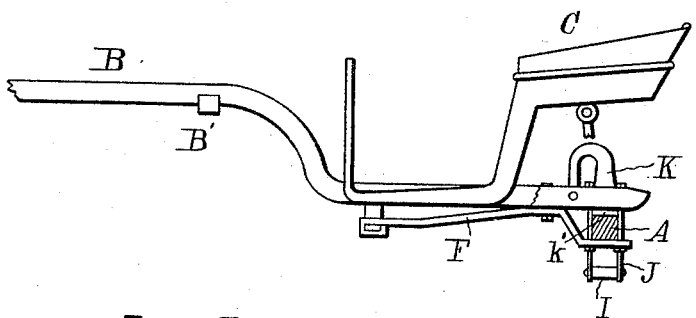
Figure 5:
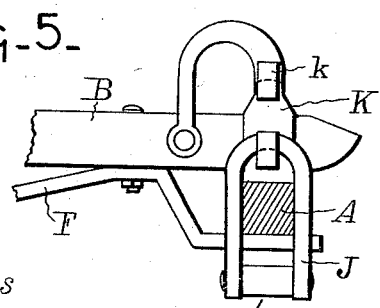

It is evident that our invention also contemplates a construction of road-cart with a phaeton body, as shown in Fig. 4, where the shafts extend out horizontally from the axle for a distance. The springs F are attached to this horizontal portion of the shafts and extend parallel with the shaft to the cross-bar E, to which they are attached, and the cross-bar in turn attached to the body. In this construction, also, the springs F may be extended from the point of connection with the shafts downward and backward to the under side of the axle and the shaft-iron engaged thereto, thus forming the clip by which the shafts are attached to the axle.

It will be readily seen that the provision of the hooks $k$ on the rear ends of the shafts for engagement with the loops is a decided advantage, since the seat may be adjusted to a higher or lower level by simply unhooking the loops from one hook and adjusting the seat to the height desired. This is accomplished without the removal of any bolts or other mechanism, and in an instant.

What we claim is—

1. In a road-cart, the combination, with the shafts and a semi-elliptic spring located beneath the axle and supporting the crate or body, of loops located on the ends of said spring, and one or more hooks located on the rear end of each shaft and adapted to engage said loops, the construction being such that the spring, and consequently the crate or body, may be adjusted to a higher or lower level, as desired, substantially as described.

2. In a road-cart, the combination, with the shafts, a semi-elliptic spring located beneath the axle, and uprights engaged to said spring and supporting the crate or body, of a loop engaged to the ends of said spring and embracing the axle, and a series of hooks located at the rear ends of the shafts and adapted for engagement with the loops, substantially as described.

3. In a road-cart, the combination, with the shafts, of the plate K, attached to the inner face of the shaft and provided with hooks $k$, said plate passed beneath the ends of the shafts $k'$ and up along the opposite sides at $k^2$, substantially as described.

4. In a road-cart, the combination, with the shafts and the crate or body, of springs fastened to the under side of the shafts, said springs at their heels constituting the forward shaft-irons for stiffening and strengthening the shafts and at their forward ends secured to and supporting the forward end of the crate or body, substantially as described.

5. In a road-cart, the combination, with the shafts and the crate or body, of springs located beneath the shafts and fastened thereto, said springs at their forward ends engaged with and supporting the forward end of the crate or body and at their rear ends constituting the forward shaft-irons, and with their extreme ends passed through the brace-rods and constituting a part of the clips by which the shafts are engaged with the axle.

In testimony whereof we sign this specification in the presence of two witnesses.

GEORGE W. BRABB.
LORING M. SMITH.

Witnesses:
M. STARKWEATHER,
A. CARGILL.